Dec. 6, 1966   R. H. J. FIEVET   3,289,807
CLUSTERING APPARATUS, AND APPLICATIONS THEREOF
Filed June 23, 1965

United States Patent Office 3,289,807
Patented Dec. 6, 1966

3,289,807
CLUSTERING APPARATUS, AND APPLICATIONS THEREOF
Robert Henri Jules Fievet, Paris (Seine), France, assignor to Fromageries Bel-La Vache Qui Rit, Paris, France
Filed June 23, 1965, Ser. No. 466,318
Claims priority, application France, June 30, 1964, 980,140, Patent 1,420,390
18 Claims. (Cl. 198—25)

In the packaging industry it is often necessary to arrange, in boxes of simple geometrical shape such as cylindrical or prismatic boxes with square or polygonal bases, objects of given geometrical shape clustered in single or multiple layers each of which is inscribable in the perimeter of the base of the box.

One of the most delicate problems to solve in such cases is that of clustering a layer of such objects within the geometrical perimeter of the base of the box. When production rates are relatively low the clustering can be done manually, but this implies the use of costly labour. On the other hand, the problem becomes much more difficult to solve when the clustering is to be accomplished within an automatic or semi-automatic high-output production cycle.

This invention provides a solution to the problem of clustering objects of given geometrical shape, such as cheese portions of prismatic shape with a triangular base intended for insertion into a cylindrical box, or sugar or chocolate portions of prismatic shape with a rectangular or square base intended for insertion into prismatic boxes with a rectangular or square base.

The invention accordingly relates to an apparatus for clustering objects of given geometrical shape into clusters inscribable in a closed contour having a centre of symmetry and/or one or several axes of symmetry, comprising a circular clustering barrel which rotates about its axis and on which are mounted at equal angular intervals, upon a circle concentric with said axis, clustering plates shaped to match said contour the number of which is such that it has no factors in common with the number of objects to be clustered, said plates being rotated, at each revolution of said barrel, about said centre or symmetry and/or moved in parallelism with said axis or axes of symmetry by a step equal to their total movement divided by the number of objects to be clustered, and each plate receiving said objects one by one in a given direction through the agency of a distributor and, after completion of a full cluster of said objects, delivering this cluster to a discharge device along a given radial direction with respect to said barrel.

The invention further encompasses the industrial applications of the apparatus hereinbefore disclosed, more particularly though not exclusively for clustering cheese portions of prismatic shape with a triangular base, within a circular perimeter the centre of which coincides with the contiguous apices of said portions opposite their cylindrical sector-shaped faces, or for clustering prismatic portions with a rectangular or square base inside a rectangular or square perimeter.

Lastly, the invention has more specifically for its object an apparatus for clustering the cheese portions referred to precedingly, in which the clustering barrel supports circular clustering plates the number of which is greater or less by one unit than the number of portions to be clustered, each plate comprising a vertically movable circular base crossed radially by partition walls which jointly bound the locations for the portions, each location receiving a portion from a distributor barrel with retractable pallets, and the base of each plate being raised after obtainment of the required cluster of portions whereby to retract said radial partitions and simultaneously insert the clustered portions into a receiving ring carried by a discharge barrel and movable thereon whereby to convey the clustered portions it contains to means for supplying packaging boxes.

The description which follows with reference to the accompanying non-limitative exemplary drawings will give a clear understanding of how the invention can be carried into practice and will reveal still further features thereof.

In the drawings,

FIG. 1 schematically illustrates the principle used for clustering six cheese portions in accordance with the invention;

FIG. 2 is a chronological tabulation of the situation of the clustering plates of FIG. 1, from the start of continuous operation of the apparatus until obtainment of a six-portion cluster;

FIG. 3 schematically illustrates the principle used for clustering eight cheese portions in accordance with the invention;

The clustering apparatus shown in FIGS. 1, 3 and 5 through 10 permits a circular clustering of $n$ prismatic cheese portions having triangular bases one side of which is a circular arc, said portions being made either on a reciprocating machine or on the barrels of a machine operating with continuous kinematics, an example being the machine described in U.S. patent applications Serial Nos. 312,716, now Patent No. 3,237,367, 405,015 and 403,257 filed by the applicant on September 30, 1963 in the case of the first-cited application and on October 12, 1964 in the case of the other two.

Figure 2:
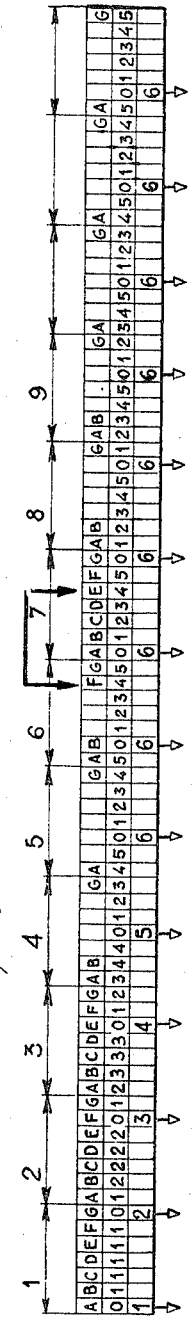
Figure 3:
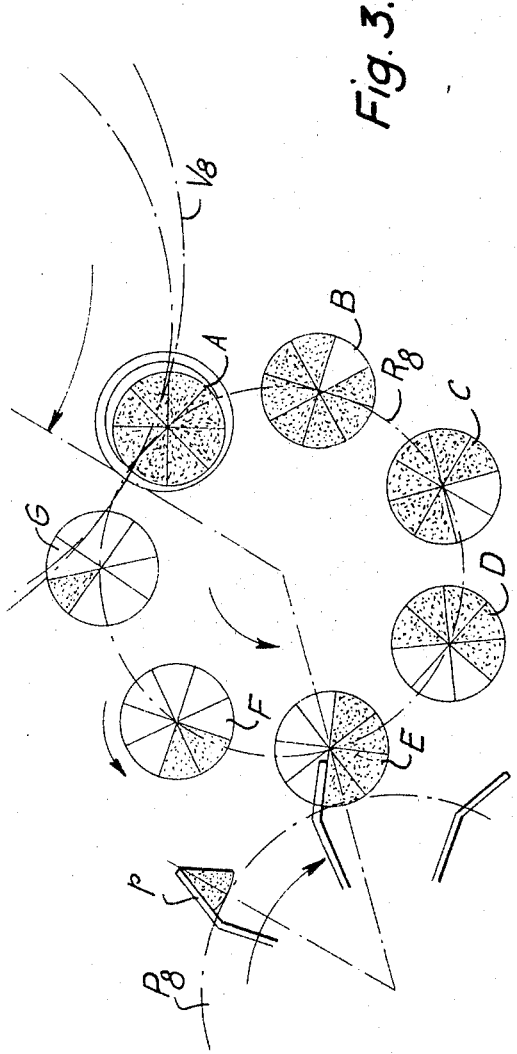
Figure 4:
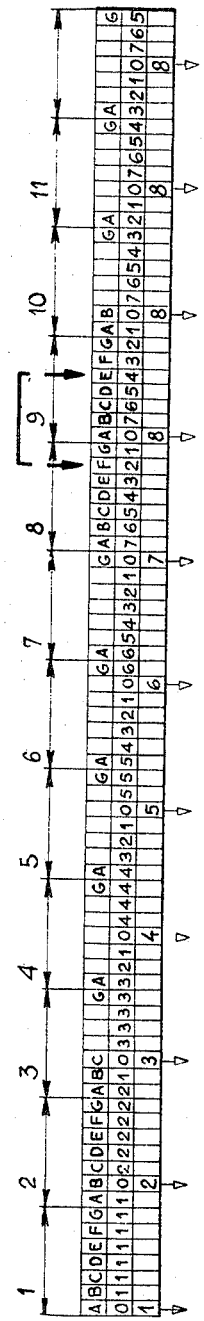
FIG. 4 is a chronological tabulation of the situations of the clustering plates of FIG. 3, from the start of continuous operation of the apparatus until obtainment of an eight-portion cluster.

The cheese portions are clustered into groups of six (FIGS. 1 and 2) or eight (FIGS. 3 and 4).

In both cases the portions are extracted from their shaping moulds by a distributor barrel $P_6$ or $P_8$ comprising multiple stations each of which is equipped with a retractable pallet $p$ adapted to position the portion $f$ it extracts from the shaping mould on the clustering barrel $R_6$ or $R_8$.

Each clustering barrel $R_6$ or $R_8$ comprises seven planet plates A, B, C, D, E, F and G. These plates are adapted to receive six portions in the case of clustering barrel $R_6$, or eight portions in the case of clustering barrel $R_8$, and are continuously rotated about their axes in such manner that in one revolution of the barrel $R_6$ or $R_8$ each plate rotates about itself through one-sixth or one-eighth of a revolution.

At each point of tangency of these plates with the distributor barrel $P_6$ or $P_8$ a portion $f$ is moved onto the corresponding plate by the corresponding pallet $p$.

At each revolution of the barrel less one-seventh of a revolution in the case of six portions (FIG. 1), or at each revolution of the barrel plus one-seventh of a revolution in the case of eight portions (FIG. 3), one of the plates (plate A in the position shown in FIGS. 1 and 3) has formed thereon a set of clustered portions which is introduced, in a given radial direction relative to the clustering barrel $R_6$ or $R_8$, into a receiving ring M associated to a multiple-station discharge barrel $V_6$ or $V_8$ which then conveys the set of portions along a path W towards a system for supplying the set to suitable packages.

The tangential velocities of the barrels P, R and V are equal, with each pallet of the distributor barrel P moving opposite one of the plates of the clustering barrel R. On the other hand, each ring M of discharge barrel V moves into position once every six plates in the case of barrel $V_6$ for six-portion clusters (FIG. 1), or once every eight plates in the case of barrel $V_8$ for eight-portion clusters (FIG. 3).

Figure 1:
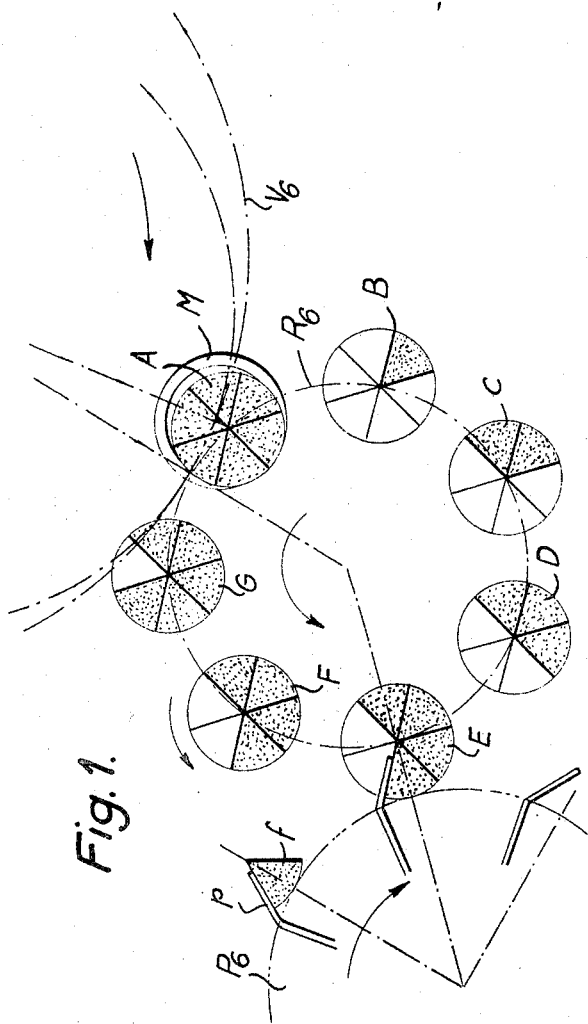

The principle of operation of the clustering system schematically illustrated in FIGS. 1 and 2 is as follows in the case of six-portion clusters:

When the apparatus is started up, all the plates of clustering barrel $R_6$ are empty. In the course of the first five revolutions of the barrel $R_6$, the first five groups obtained are systematically discharged when the plates supporting them respectively occupy the position of plate A in FIG. 1. Thus, sets comprising one, two, three, four and five portions respectively are discharged. From the sixth revolution onwards sets of six portions are systematically evacuated.

The filling process is clearly explained in the table in FIG. 2, in which the first line represents the successive positions of plates A, B, C, D, E, F and G, the second line the number of portions carried by each plate as the filling proceeds, and the third line the number of clustered portions discharged.

FIG. 1 represents the apparatus when it has reached its normal clustering phase after the plates A, B, C, D and E have completed seven revolutions, and the plates F and G six revolutions only since they are positioned ahead of the point where the portions are loaded by the pallets $p$. Plate A has six portions that will be dicharged, plate B one portion, plate C two portions, plate D three portions, plate E four portions, plate F four portions and plate G five portions.

It will be noted that two consecutive plates have four portions. This is due to the fact the number of plates is greater than the number of portions by one unit.

An examination of the table in FIG. 2 shows that two consecutive plates with five portions are obtained for the next first cycle, two plates with no portions for the next second cycle, two plates with one portion for the next third cycle, and so on.

In the case of eight-portion clusters (see FIGS. 3 and 4) the process is identical except that in this case the first seven discharges are incomplete and successively involve sets of one, two, three, four, five, six and seven portions respectively. The filling process is shown by the table in FIG. 4, which is similar to that of FIG. 2.

FIG. 3 shows the machine when it has reached its normal clustering phase, with plates A, B, C, D and E being positioned past the point where distribution is effected by distributor plate $P_8$ and plates F and G positioned ahead of this distribution point. Plate A has eight portions to be discharged, plate B seven portions, plate C six portions, plate D five portions, plate E four portions, plate F two portions and plate G one portion.

There is no plate with three portions owing to the fact that the number of plates is less than the number of portions by one unit.

In the subsequent cycles, conversely to the case of six-portion clusters, there is no plate with four portions in the first cycle, no plate with five portions in the second cycle, and so on.

The clustering principle according to the present invention will operate only provided that the number of plates and the number of portions have no factors in common. This requirement is met in both the cases referred to precedingly by way of example, in which, if $n$ be the number of portions, then the number of plates is equal to $n+1$ for six-portion clusters or $n-1$ for eight-portion clusters.

The truth of this law can be verified by preparing a table similar to that of FIG. 4 for the case of an eight-portion cluster and by using a clustering barrel equipped with five plates H. I, J, K and L, since the number 5 has no factors in common with the number 8. In this particular case, a clustering cycle will involve one revolution of the clustering barrel plus three-fifths of a revolution.

Considering then the five plates of this clustering barrel in the position wherein the plate H carries eight portions like the plate A in the case of FIG. 3, with the plates I, J, K being past the distribution point and the plate L ahead thereof, it will be seen that the plate I has five portions, the plate J two portions, the plate K seven portions and the plate L three portions. This distribution is repeated each time one of the five plates carries eight portions.

Figure 5:
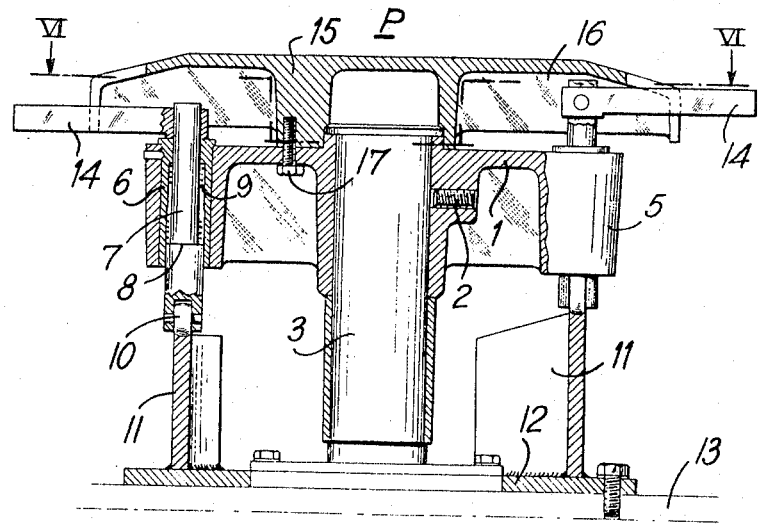
FIGS. 5 and 6 are respectively sections on the lines V—V of FIG. 6 and VI—VI of FIG. 5, of a cheese portion distributing barrel with retractable pallets.
Figure 6:
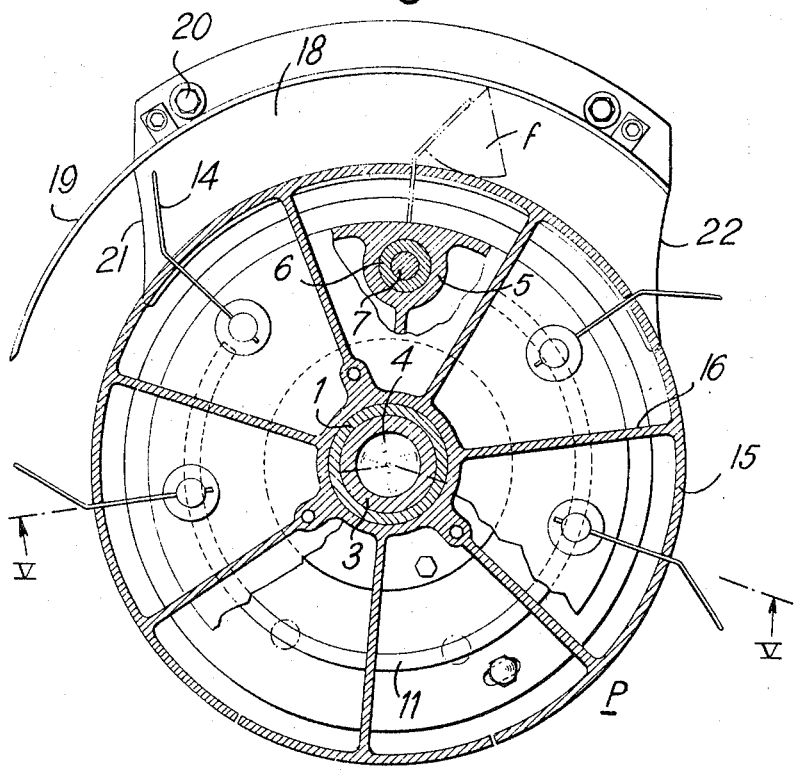
Figure 7:
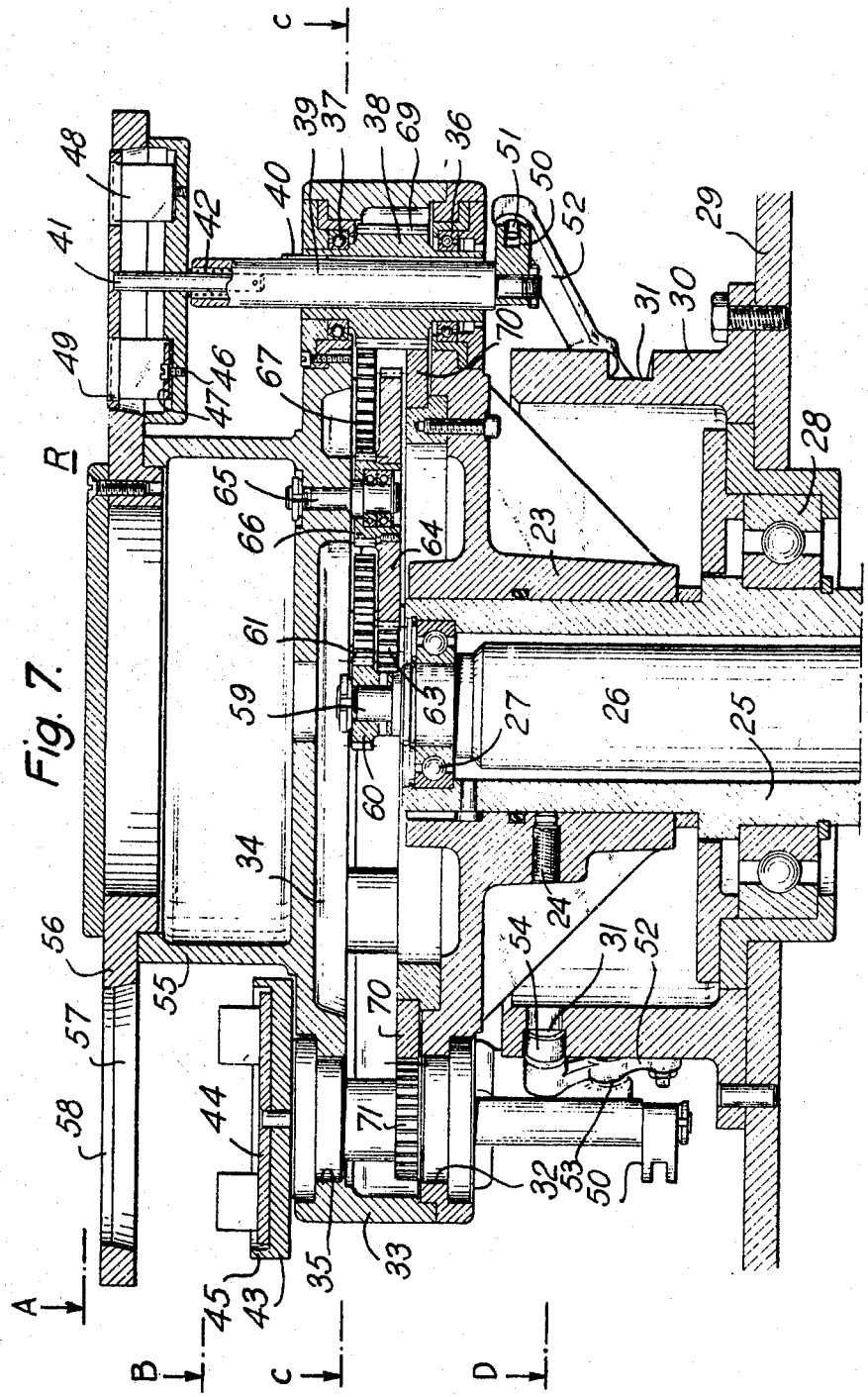
FIG. 7 is a section on the line VII—VII of FIG. 8 of a clustering barrel according to the invention for clustering eight cheese portions.
Figure 8:
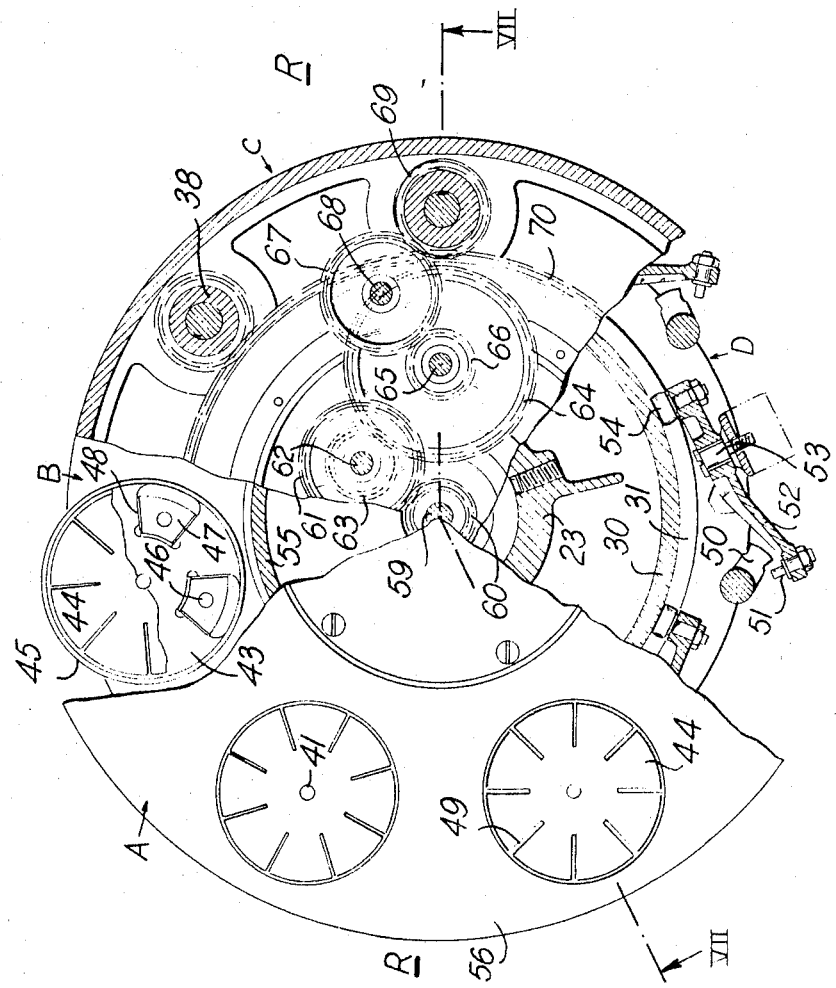
FIG. 8 represents four partial sections of the clustering barrel of FIG. 7, taken through the planes A, B, C and D of FIG. 7.
Figure 9:
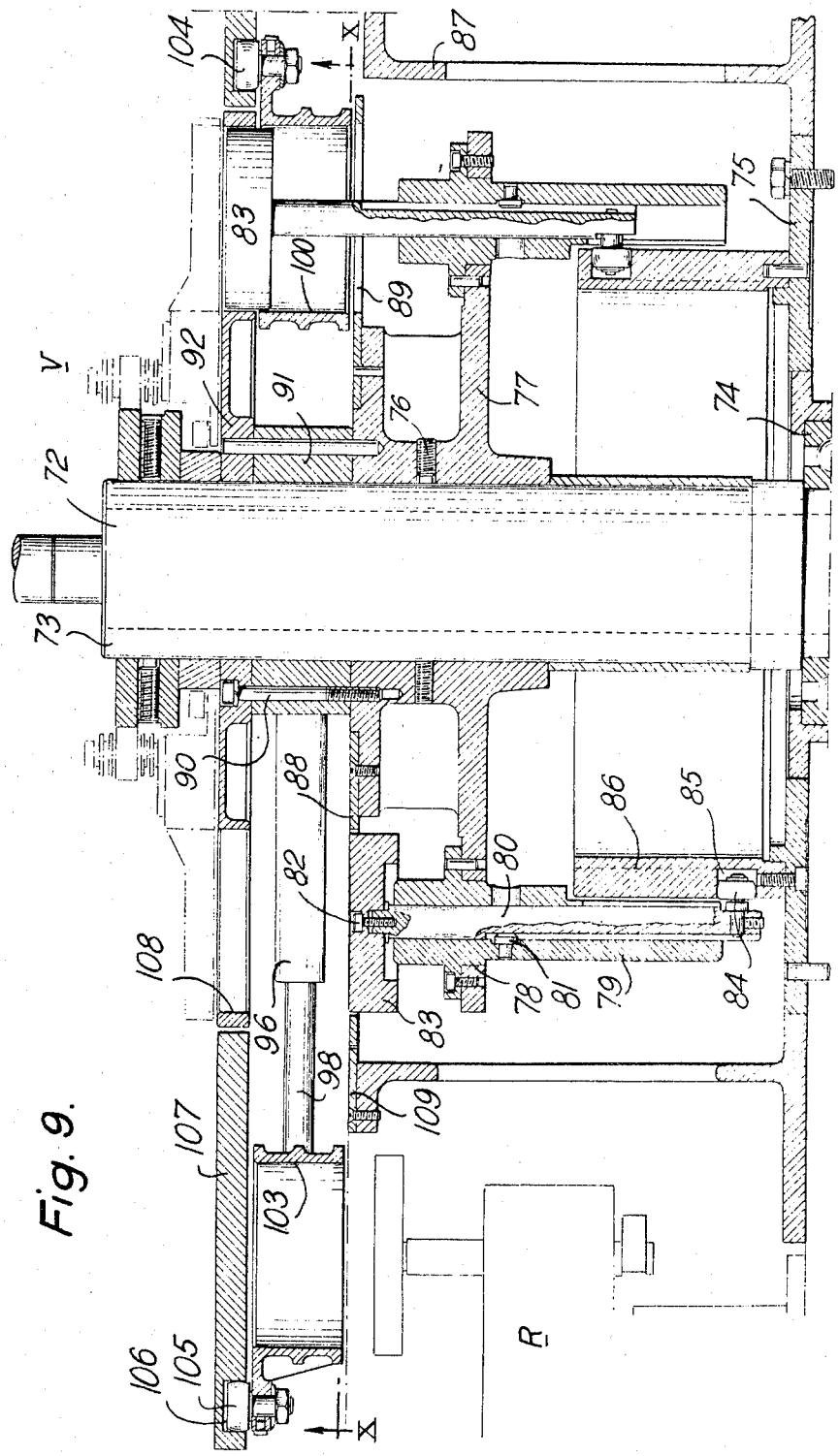
FIG. 9 is a diametrical section of a barrel for discharging the portions clustered on the clustering barrel of FIGS. 7 and 8, taken through the centers of the discharge rings of said discharge barrel.
Figure 10:
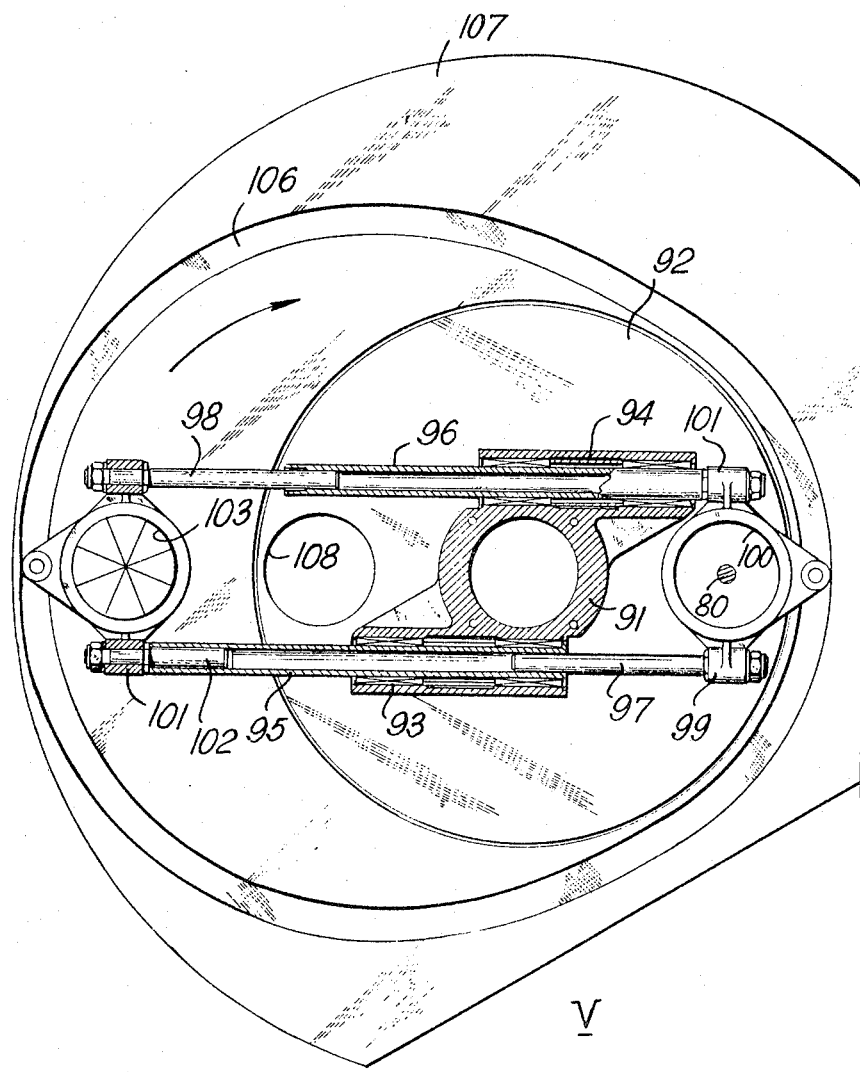
FIG. 10 is a section taken on the line X—X of FIG. 9.

FIGS. 5 through 10 illustrate a form of embodiment of a clustering apparatus according to the invention for clustering eight prismatic cheese portions with a triangular base one side of which is a circular arc the centre of which lies on the opposite apex of the triangle, with FIGS. 5 and 6 representing the distributor barrel, FIGS. 7 and 8 the clustering barrel and FIGS. 9 and 10 the discharge barrel.

As in the case of the barrels described in the patent applications cited precedingly, each of these barrels is rigidly connected to a rotating pillar which is mounted on a fixed central shaft and rotated thereabout by any convenient means. As is more particularly described in the said patent applications, this rotary drive may be imparted to each barrel through the medium of a worm-gear which is carried by a horizontal shaft equipped with upflow and downflow take-offs and which meshes with a helical gearwheel carried by the pillar of each barrel. Alternatively, the drive could be imparted to only one barrel equipped with such a helical gearwheel, the pillars of the remaining barrels being equipped with a pinion engaging with a gearwheel mounted on the pillar of the single drive barrel and/or on the pillar of the other barrel.

In the specific form of embodiment shown in FIGS. 5 and 6, the distributor barrel P comprises a main casting 1 rigidly connected by any convenient means such as screws 2, for example, to a rotating pillar 3 mounted on a fixed central shaft 4. The main casting 1 is equipped with seven vertical cylindrical sleeves 5 spaced at equal angular intervals and in which are mounted tubular guides 6. In each of these guides is a reciprocating rod 7 having a shoulder 8 formed thereon which, jointly with the guide 6, forms a chamber enclosing a spring 9. At its lower end the rod 7 carries a follower 10 adapted to roll over a cam track 11 formed on a cylindrical part rigid with the barrel foot 12, which is in turn fixed onto a table 13. At its upper end each rod 7 carries a pallet 14. A cap 15 divided into seven recesses by radial ribs 16 is secured by screws 17 to the main barrel casting, with each recess housing a pallet 14.

A horizontal guide formed with a vertical flange 19 is fixed to the machine stand by means of columns 20 in such manner that its bottom be level with the upper face of the barrel casting 1. This bottom is bounded by two edges 21 and 22 shaped as circular arcs the radii of which are equal to the radius of a barrel adapted to transfer cheese portions withdrawn from their moulds, and to the radius of the clustering barrel, respectively.

The cheese portions arranged on the transfer barrel are taken up singly by the pallets 14 as they move opposite the vertical flange 19. They first travel on the transfer barrel, then along the horizontal portion of the guide 18, as is clearly shown in respect of the portion f in FIG. 6. When this portion approaches the arc 22, the cam 11 co-acts with the follower 10 and raises the pallet 14, as shown on the right-hand side of FIG. 5. As it rises, this pallet continues to displace the portion f and disengages from it after it has been moved by the pallet onto the corresponding plate of the clustering barrel.

Reference to FIGS. 7 and 8 shows that the clustering barrel R comprises a main casting 23 secured by screws 24 onto its rotating pillar 25 which is positively centered upon the fixed central shaft 26 by means of anti-friction bearings such as the bearing 27. The rotating pillar 25 is further positively centered by an anti-friction bearing 28 in a platen 29 onto which is fixed a cylindrical part 30 having an external cam groove 31 formed thereon.

The barrel casting 23 is formed with seven stepped bores 32 therein and supports a cap 33 which is spaced therefrom as at 34 and formed with stepped bores 35 therein coaxial with the bores 32. Inside each pair of bores 32, 35 is mounted, through the medium of anti-friction bearings 36 and 37, a plate-driving part 38 through which is vertically slidable a rod 39 rigidly united with the part 38 by a key 40. Fixed into a housing formed at the top of the rod 39 is a pin 41 over which is fitted a spring 42. The plate proper comprises two parts, to wit a lower part 43 and an upper base 44. The spring 42 bears against said lower part and the pin 41 is slidable through the latter. The part 43 is formed with a rim flange 45 and, in the housing formed thereby, are fixed to the bottom of said part, through the medium of screws 46 and clamping members 47, four yokes 48 made of thin sheet metal the flanges of which are positioned at equal angular intervals along radii from the axis of the shaft 41. The vertical flanges of these yokes are inserted into radial slits 49 formed in the plate base 44.

Each rod 39 carries at its bottom a fork 50 adapted to engage, in the course of one of the clustering stages, with a stub 51 carried on one end of a lever 52 pivotally connected at 53, the other end of which carries a follower 54 cooperating with the cam groove 31.

Into an upward extension 55 of the cap 33 is driven a supporting plate 56 formed, coaxially with the bores 32 and 35, with a bore embodying a lower frusto-conical portion 57 and an upper cylindrical portion 58, the diameter of the lower larger base of the cone frustum 57 being included between the inner and outer diameters of the flange 45 of the part 43.

A pinion 60 is mounted in the housing 34 on a bearing 59 formed on the end of the fixed central shaft 26. This pinion meshes with a gearwheel 61 carried by a shaft 62 onto which is keyed a pinion 63. The pinion 63 meshes with a gearwheel 64 which is rotatable about a shaft 65 and is rigid with a pinion 66 meshing with a gearwheel 67 carried by a shaft 68. The gearwheel 67 engages with pinion teeth 69 formed on one of the parts 38 and the length of which is such as to enable it to also mesh with an external ring-gear 70 which meshes in turn with pinions 71 carried by the remaining parts 38. The number of teeth on these various pinions and gearwheels is such that for one revolution of the barrel casting 23 about the fixed central shaft 26, each plate 43, 44 rotates through one-eighth of a revolution about the axis of the corresponding rod 39.

The device hereinbefore described functions in the following manner:

In the position of reception of the cheese portions, each plate 43, 44 is disposed as shown on the left-hand side of FIG. 7, with its lower part 43 bearing against the upper face of the cap 33, the latter being level with the upper face of the casting 1 of distributor barrel P. As a result, the flanges of the yokes 47 project above the upper part 44 of the plate.

In the course of their path about the fixed central shaft 26, the plates 43, 44 are circumscribed by a circular line of which the distributor barrel arc 22 is part. As the outer surface of the flange 45 of one of the plates shifts tangentially to the arc 22, one of the distributor plate pallets 14 introduces a cheese portion into one of the eight spaces formed on the base of plate 44 by the projecting yokes 47. This process is repeated until the eighth cheese portion is placed on the plate.

During this time the fork 50, which rotates through one-eighth of a revolution for each revolution of the clustering barrel about the axis of the rod 39, will not have engaged with the stub 51 of the corresponding lever 52. During the next seventh of a revolution covered by the barrel, the fork 50 engages with the stub 51, whereby the plate is raised responsively to the action of the cam groove 31, as shown on the right-hand side of FIG. 7. In the course of this motion the flange 45 of the lower part 43 butts beneath the mounting plate 56 while the base of plate 44 continues its upward movement and compresses the spring 42. This movement stops when the upper face of said base is level with the upper face of mounting plate 56. The eight cheese portions disengaged thus from the flanges of the yokes 48 are then taken up by the discharge barrel, as will be explained hereinafter.

As shown in FIGS. 9 and 10, the discharge barrel V comprises a fixed central shaft 72 about which rotates a pillar 73 located by a ball-bearing 74 on a platen 75. A barrel casting 77 formed with two diametrically opposed bores 78 is fixed onto this pillar by means of a screw 76. In each of these bores is mounted a vertical guide 79 inside which reciprocates a rod 80 guided by a key 81 and having its upper end rigidly connected by a screw 82 to a piston 83.

At its lower end the rod 80 carries a follower 84 riding in a cam groove 85 formed on the outer wall of a cylindrical part 86 fixed to the platen 75. The entire system is supported in a stand 87. A lower mounting plate 88 carried by the barrel casting 77 has its upper face level with the upper face of the base 44 of the clustering-barrel plate when the latter is in the raised position. Two diametrically opposed holes 89 are formed to the diameter of the pistons 83 on the mounting plate 88.

Upon the casting 77 are superimposed and fixed by screws 90 a guide part 91 and an upper mounting plate 92. The guide part 91 is centrally located on the pillar 73 and formed with two guide tracks 93 and 94 which are parallel to a diametrical plane of the barrel and diametrically opposed with respect to the central shaft 72. In these guide tracks are slidable two tubular parts 95 and 96 on one of the ends of which are fixed two rods 97 and 98. Each rod 97 (or 98) is fixed to one of the lobes 99 of receiver ring 100, the other lobe 101 of which is fixed by means of a rod 102 to the other end of the corresponding tube 95 (or 96). Thus there are two receiver rings 100 and 103 adapted to move in parallelism with the guideways 93 and 94 responsively to followers 104 and 105 which are fixed respectively to these rings and ride in a cam groove 106 formed beneath a plate 107 which is coaxial with the mounting plate 92 and fixed in any convenient manner to the enclosure 87. This cam groove is so devised that the rings 100 and 103 are capable of occupying the limit positions shown in FIG. 10.

The mounting plate 92 is formed with two diametrically opposed bores 108 to the diameter of the pistons 83, the diameters of which pistons are in turn equal to the inner diameter of the rings 100 and 103. The upper face of the lower mounting plate 88 is level with the upper face of the mounting plate 56 of clustering barrel R.

The relative dimensions and positions of the clustering barrel R and the discharge barrel V are such that a ring 100 or 103 registers above an eight-portion-bearing plate of the clustering barrel at each revolution plus one-seventh of a revolution of the clustering barrel, the eight clustered portions being then positioned on the base 44 in its upward position, namely level with the upper face of the mounting plate 56.

The discharge barrel then functions in the following manner:

Whichever of the rings 100 or 103 is located furthermost from the fixed central shaft 72 (as shown on the left-hand side of FIG. 9) will be in a position aligned with the clustering plate bearing eight portions. Upon being raised, as shown on the right-hand side of FIG. 7, this plate fetches the portions to the common level of mounting plates 56 and 88 and slips them, still clustered together, into the corresponding ring 100 or 103. This ring then revolves about the shaft 72 in the direction of the arrow in FIG. 10, carrying with it the portions which first rest on the mounting plate 56 of clustering barrel R and then, as the ring 100 or 103 gradually moves nearer to the central shaft 72 responsively to the cam 106, rest on a platen 109 mounted on the stand 87. When the ring reaches the position of the ring 100 in FIG. 10, the piston 83 raised responsively to cam 85 ejects the portions from the ring and fetches them to the common level of the upper faces of mounting plate 92 and plate 107.

In this position the clustered portions can be taken up from the discharge barrel by any convenient means adapted to introduce them into a packaging finishing line. Such means may advantageously be of the kind described in U.S. patent application Serial No. 420,402, now Patent No. 3,256,970, filed by the applicant on December 22, 1964. A system of this type is illustrated in dot-dash lines in FIG. 9, on the left-hand side of which are additionally shown in solid thin lines the corresponding component parts of the clustering barrel R.

The motions of the distributor, clustering and discharge barrels P, R and V, respectively, are calculated so as to ensure that the tangential velocities of these barrels be equal.

It goes without saying that many changes and substitutions of parts could be made to the specific forms of embodiment described hereinabove without departing from the scope of the invention. By way of example, in cases where it is required to cluster eight cheese portions by means of a clustering barrel equipped solely with five plates, each of these plates would be driven through one-eighth of a revolution for each revolution of the barrel with the discharge barrel rings registering above a plate carrying eight cheese portions each time the clustering barrel has completed one revolution plus three-fifths of a revolution.

An apparatus of the same type as that just described could be used for clustering square or rectangular based prismatic portions such as chocolate or sugar portions in a square or rectangular perimeter. In such an apparatus the rotary motion of the clustering barrel plates would be replaced by a first stepwise translation parallel to one of the sides of the perimeter, the number of steps in this translation being equal to the number of portions to be arranged in a row parallel to said side, followed, after a shift parallel to the other sides of the perimeter at right angles to the first side referred to, by a second identical stepwise translation in the same direction as on in the opposite direction to the first translation, and so on, the number of said shifts being equal to the number of rows of portions inscribable in said perimeter. The obtainment of such motions is well known to the specialist in the art and calls for no illustration or description.

In cases where the clustering is to be effected in several similar layers of clustered portions, the transition from one layer to the next may be effected either directly upon the clustering plates (which would be caused to shift by one step vertically after completion of a clustered layer), or subsequently, after discharge, by a device adapted to receive the different layers of clustered portions in stacked form.

What is claimed is:

1. An apparatus for grouping objects of given geometrical shape into clusters inscribable in a closed perimeter having a center of symmetry, like prismatic cheese portions with a triangular base designed to be clustered into a circular perimeter the center of which coincides with the contiguous apices of said portions lying opposite the cylindrical sector-shaped faces of the latter, comprising in combination, a circular clustering barrel, means for rotating said clustering barrel about its axis, clustering plates shaped to said closed perimeter the number of which has no factors in common with the number of objects to be clustered and which are mounted on said clustering barrel at equal angular intervals along a circle the center of which lies on the axis of said clustering barrel, means for rotating said clustering plates about said center of symmetry at each revolution of said clustering barrel, through a step equal to their total travel divided by the number of objects to be clustered, a distributor, means for supplying each of said clustering plates with the objects one by one from said distributor and in a predetermined direction, a discharging device and means for delivering the objects one by one from said clustering barrel to said discharging device in a predetermined radial direction with respect to said clustering barrel.

2. A clustering apparatus according to claim 1, wherein the number of clustering plates differs by one unit from the number of objects to be clustered.

3. An apparatus for grouping objects of given geometrical shape into clusters inscribable in a closed perimeter having at least one axis of symmetry, like prismatic portions with a rectangular or square base designed to be clustered inside a rectangular or square perimeter, comprising, in combination, a circular clustering barrel, means for rotating said clustering barrel about its axis, clustering plates shaped to said closed perimeter the number of which has no factors in common with the number of objects to be clustered and which are mounted on said clustering barrel at equal angular intervals along a circle the center of which lies on the axis of said clustering barrel, means for moving said clustering plates in parallelism to each of said axes of symmetry, at each revolution of said clustering barrel, through a step equal to their total travel divided by the number of objects to be clustered, a distributor, means for supplying each of said clustering plates with the objects one by one from said distributor and in a predetermined direction, a discharging device and means for delivering the objects one by one from said clustering barrel to said discharging device in a predetermined radial direction with respect to said clustering barrel.

4. A clustering apparatus according to claim 3, wherein the number of clustering plates differs by one unit from the number of objects to be clustered.

5. An apparatus for grouping prismatic cheese portions having a triangular base with one circular arcuate side centered upon the opposite apex into a circular perimeter the center of which coincides with the contiguous apices of said portions lying opposite the cylindrical sector-shaped faces of the latter, comprising, in combination, a circular clustering barrel having a stand, means for rotating said clustering barrel about its axis, circular clustering plates shaped to said circular perimeter the number of which differs by one unit from the number of portions to be clustered and which are mounted on said clustering barrel at equal angular intervals along a circle the center of which lies on the axis of said clustering barrel, means for rotating said clustering plates about the center of said circular perimeter, at each revolution of said clustering barrel, through a step equal to their total travel divided by the number of objects to be clustered, a circular base on each of said clustering plates, means for vertically moving said circular base, partition walls crossing radially said base and defining between them the locations for the portions, a distributing barrel, retractable pallets on said distributing barrel for placing a portion in each of said locations, a discharging barrel, a receiver ring carried by said discharging barrel means for raising the base of each plate after obtainment of the desired cluster of portions whereby to retract said radial partition walls and simultaneously introduce the clustered portions into said receiver ring, means for supply packaging boxes and means for moving said receiver ring on said discharging barrel, whereby to convey the clustered portions it contains to said means for supplying packaging boxes.

6. A clustering apparatus according to claim 5, wherein the tangential velocities of said distributing, clustering and discharging barrels are equal.

7. A clustering apparatus according to claim 6, which comprises a first positively rotatable pillar rigid with said distributing barrel, a first fixed central shaft on which said first pillar is mounted, means for positively rotating said first pillar about said first shaft, a second positively rotatable pillar rigid with said clustering barrel, a second fixed central shaft on which said second pillar is mounted, means for positively rotating said second pillar about said second shaft, a third positively rotatable pillar rigid with said discharging barrel, a third fixed central shaft on which said third pillar is mounted and means for positively rotating said third pillar about said third shaft.

8. A clustering apparatus according to claim 7, wherein the number of said pallets on said distributing barrel is equal to the number of said clustering plates.

9. A clustering apparatus according to claim 8, which comprises means for guiding said portions, a cam track, countering spring means and means for moving said pallets along said means for guiding the portions and vertically against said countering spring means responsively to said cam track, whereby each pallet deposits the portion it has taken up onto the corresponding plate of said clustering barrel, the final elevation of said pallets being greater than the height of the portions.

10. A clustering apparatus according to claim 7 wherein each of said clustering plates comprises a lower part having a flange, yokes mounted at equal angular intervals in said flanged lower part, a shaft for positively rotating said clustering plate, an upper base having radial slots formed therein and being rigid with said plate shaft, the edges of said yokes extending through said radial slots, a fork supported on the lower end of said plate shaft, a lever pivotally connected to the barrel stand at one end, a stub carried by said lever, said fork being adapted to engage with said stub, when the corresponding plate has received the required number of portions, a follower at the other end of said lever, a cam groove formed on said stand and in which said follower is adapted to roll, a mounting-plate having a bore therein through which said upper base is movable, spring means acting against the movement of said upper base, whereby to move said flange on said lower part of the plate into pressure contact, when said plate is raised, against the undersurface of said mounting-plate and whereby to fetch the clustered portions level with the upper surface of said mounting-plate, and said plates being level, when in their lowermost position, with said portion-guiding means associated to said distributing barrel.

11. A clustering apparatus according to claim 10, which comprises a part rigidly united with each of said plate shafts and adapted to rotate about the axes of said shaft, external gear teeth on one of said parts, a fixed pinion mounted on said second fixed central shaft, a pinion-and-gearwheel transmission device driving said external gear teeth off said fixed pinion, an external ring-gear coaxial with said clustering barrel and pinions rigidly united with the others of said parts, said external ring-gear meshing with said gear teeth and with said pinions.

12. A clustering apparatus according to claim 7, wherein said discharging barrel comprises two clustered-portions-receiving-rings located upon a common diametrical plane, two slides parallel to said common diametrical plane interconnecting said two receiving rings on either side of said fixed third shaft, guideways which are formed in a part rigidly connected to said third pillar and in which said slides are displaceable, a cam groove, two followers located in said common diametrical plane which are respectively rigid with said rings and which ride in said cam groove whereby to alternately move one of said rings toward and the other away from said shaft, the ring remote from said shaft registering above the raised clustering plate after all the portions have been clustered thereon, two pistons supported by the body of said discharging barrel in said common diametrical plane, a cylindrical cam groove, two followers respectively mounted on said pistons and located in said cylindrical cam groove in order to move vertically said pistons, and a packaging line, whereby to extract the clustered portions contained in the ring lying nearer to said fixed shaft and deliver them to said packaging line.

13. A clustering apparatus according to claim 7, wherein each discharging barrel ring registers above a clustering plate carrying the clustered cheese portions each time said clustering barrel has rotated through an angle differing from 360° by the difference existing between the number of portions to be clustered and the number of clustering plates.

14. A clustering apparatus according to claim 4, which comprises means for giving to each clustering plate a first stepwise translation parallel to one of the sides of said perimeter, the number of steps involved in this first translation being equal to the number of portions to be arranged in a row parallel to said side, means for giving then to each clustering plate a shift parallel to the sides of said perimeter at right angles to the first-mentioned side and means for giving then to each clustering plate a second stepwise translation similar to the first one, in the same direction as or in the opposite direction to said first translation, the number of these shifts being equal to the number of rows of portions inscribable in said perimeter.

15. An apparatus for grouping objects of given geometrical shape in a plurality of similar layers and into clusters inscribable in a closed perimeter having a centre of symmetry, like prismatic cheese portions with a triangular base designed to be clustered into a circular perimeter the center of which coincides with the contiguous apices of said portions lying opposite the cylindrical sector-shaped faces of the latter, comprising, in combination, a circular clustering barrel, means for rotating said clustering barrel about its axis, clustering plates shaped to said closed perimeter the number of which has no factors in common with the number of objects to be clustered and which are mounted on said clustering barrel at equal angular intervals along a circle the centre of which lies on the axis of said clustering barrel, means for rotating said clustering plates about said centre of symmetry at each revolution of said clustering barrel, through a step equal to their total travel divided by the number of objects to be clustered, a distributor, means for supplying each of said clustering plates with the objects one by one from said distributor and in a predetermined direction, a discharging device, means for delivering the objects one by one from said clustering barrel to said discharging device in a predetermined radial direction with respect to said clustering barrel, and means for shifting vertically said clustering plates after obtention of a layer of clustered portions, whereby to effect directly the transition from one layer to the next upon said clustering plates.

16. An apparatus for grouping objects of given geometrical shape in a plurality of similar layers and into clusters inscribable in a closed perimeter having at least one axis of symmetry, like prismatic portions with a rectangular or square base designed to be clustered inside a rectangular or square perimeter, comprising, in combination, a circular clustering barrel, means for rotating said clustering barrel about its axis, clustering plates shaped to said closed perimeter the number of which has no factor in common with the number of objects to be clustered and which are mounted on said clustering barrel at equal angular intervals along a circle the center of which lies on the axis of said clustering barrel, means for moving said clustering plates in parallelism to each of said axes of symmetry, at each revolution of said clustering barrel, through a step equal to their total travel divided by the number of objects to be clustered, a distributor, means for supplying each of said clustering plates with the objects one by one from said distributor and in a predetermined direction, a discharging device, means for delivering the objects one by one from said clustering barrel to said discharging device in a predetermined radial direction with respect to said clustering barrel, and means for shifting vertically said clustering plates after obtention of a layer of clustered portions, whereby to effect directly the transition from one layer to the next upon said clustering plates.

17. An apparatus for grouping objects of given geometrical shape in a plurality of similar layers and into clusters inscribable in a closed perimeter having a center of symmetry, like prismatic cheese portions with a triangular base designed to be clustered into a circular perimeter the center of which coincides with the contiguous apices of said portions lying opposite the cylindrical sector-shaped faces of the later, comprising, in combination, a circular clustering barrel, means for rotating said clustering barrel about its axis, clustering plates shaped to said closed perimeter the number of which has no factors in common with the number of objects to be clustered and which are mounted on said clustering barrel at equal angular intervals along a circle the center of which lies on the axis of said clustering barrel, means for rotating said clustering plates about said center of symmetry, at each revolution of said clustering barrel, through a step equal to their total travel divided by the number of objects to be clustered, a distributor, means for supplying each of said clustering plates with the objects one by one from said distributor and in a predetermined direction, a discharging device, means for delivering the objects one by one from said clustering barrel to said discharging device in a predetermined radial direction with respect to said clustering barrel, and means for receiving the different layers of clustered portions in stacked form subsequent to discharging of said clustered portions.

18. An apparatus for grouping objects of given geometrical shape in a plurality of similar layers and into clusters inscribable in a closed perimeter having at least one axis of symmetry, like prismatic portions with a rectangular or square base designed to be clustered inside a rectangular or square perimeter, comprising, in combination, a circular clustering barrel, means for rotating said clustering barrel about its axis, clustering plates shaped to said closed perimeter the number of which has no factors in common with the number of objects to be clustered and which are mounted on said clustering barrel at equal angular intervals along a circle the center of which lies on the axis of said clustering barrel, means for moving said clustering plates in parallelism to each of said axes of symmetry, at each revolution of said clustering barrel, through a step equal to their total travel, divided by the number of objects to be clustered, a distributor, means for supplying each of said clustering plates with the objects one by one from said distributor and in a predetermined direction, a discharging device, means for delivering the objects one by one from said clustering barrel to said discharging device in a predetermined radial direction with respect to said clustering barrel, and means for receiving the different layers of clustered portions in stacked form subsequent to discharging of said clustered portions.

No references cited.

EVON C. BLUNK, *Primary Examiner.*

M. L. AJEMAN, *Assistant Examiner.*